US009925829B2

(12) United States Patent
von Bordelius et al.

(10) Patent No.: US 9,925,829 B2
(45) Date of Patent: Mar. 27, 2018

(54) CASTOR WITH PIN-ACTIVATED BRAKE

(71) Applicant: GROSS + FROELICH GMBH & CO. KG, Weil der Stadt (DE)

(72) Inventors: Ralph von Bordelius, Bad Liebenzell (DE); Hans-Wilhelm Rottenau, Hechingen (DE)

(73) Assignee: GROSS + FROELICH GMBH & CO. KG, Weil der Stadt (DE)

( * ) Notice: Subject to any disclaimer, the term of this patent is extended or adjusted under 35 U.S.C. 154(b) by 0 days.

(21) Appl. No.: 15/003,319

(22) Filed: Jan. 21, 2016

(65) Prior Publication Data
US 2016/0221393 A1 Aug. 4, 2016

(30) Foreign Application Priority Data

Jan. 23, 2015 (DE) .................. 10 2015 201 194

(51) Int. Cl.
*B60B 33/00* (2006.01)
(52) U.S. Cl.
CPC ...... *B60B 33/0094* (2013.01); *B60B 33/0081* (2013.01)
(58) Field of Classification Search
CPC ............ B60B 33/0081; B60B 33/0094; B60B 33/0078; B60B 33/021; B60B 33/028
USPC .................................................. 16/45, 35 R
See application file for complete search history.

(56) References Cited

U.S. PATENT DOCUMENTS

| 4,997,066 A * | 3/1991 | Bigo ...................... B62B 9/087 188/20 |
| 5,133,106 A * | 7/1992 | Milbredt ............... B60B 33/021 16/35 R |
| 5,379,486 A * | 1/1995 | Wang .................... A45C 13/262 16/113.1 |
| 5,581,846 A * | 12/1996 | Wang .................... A45C 13/262 16/113.1 |
| 5,617,934 A * | 4/1997 | Yang ................... B60B 33/0042 16/35 R |
| 6,360,851 B1 * | 3/2002 | Yang ................... B60B 33/0028 16/35 R |
| 9,139,044 B1 * | 9/2015 | Tsai ....................... B60B 33/021 |

(Continued)

FOREIGN PATENT DOCUMENTS

DE 1 924 542 9/1965
DE 2 218 411 10/1973
(Continued)

OTHER PUBLICATIONS

Search Report of German Patent Office issued in Application No. 10 2015 201 194.1, dated Nov. 11, 2015 (7 pages).

*Primary Examiner* — Emily M Morgan
(74) *Attorney, Agent, or Firm* — Flynn, Thiel, Boutell & Tanis, P.C.

(57) ABSTRACT

The invention relates to a castor with at least one wheel (16, 18), a housing (10) carrying the at least one wheel (16, 18), and a runner pin (14) which is arranged so as to be movable to a limited extent in a substantially vertically oriented housing opening (12) and which serves to connect the castor to an object, wherein the housing (10) accommodates a brake device which frees the at least one wheel (16, 18) in a state in which the castor is loaded by a weight via the runner pin (14) and which acts with a braking effect on the at least one wheel (16, 18) in a state when not loaded by a weight.

12 Claims, 5 Drawing Sheets

(56) References Cited

U.S. PATENT DOCUMENTS 9,527,347 B2 * 12/2016 Spektor ............... B60B 33/0081
2007/0056141 A1 * 3/2007 Armano ............. B60B 33/0021
                                                          16/35 R
2010/0107361 A1 * 5/2010 Yang .................. B60B 33/0021
                                                          16/47
2014/0143982 A1 * 5/2014 Hamasaki ............ B60B 33/025
                                                          16/35 R

FOREIGN PATENT DOCUMENTS

DE   20 2012 000 446 U1   4/2012
EP        0 434 916 A1    7/1991

* cited by examiner

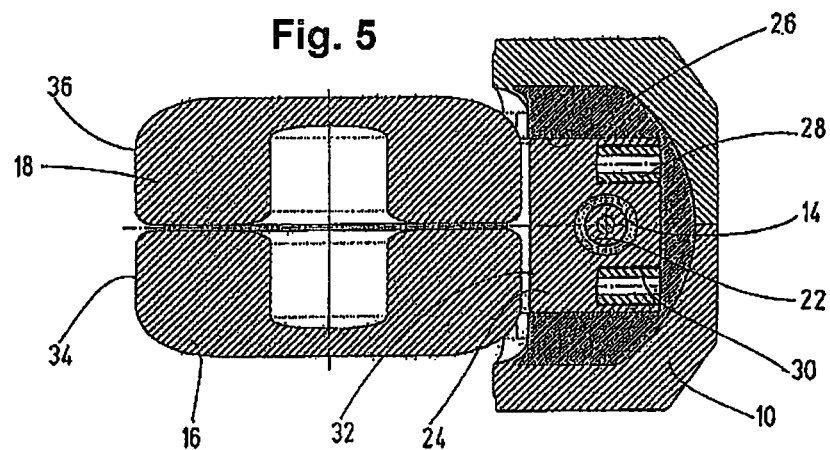
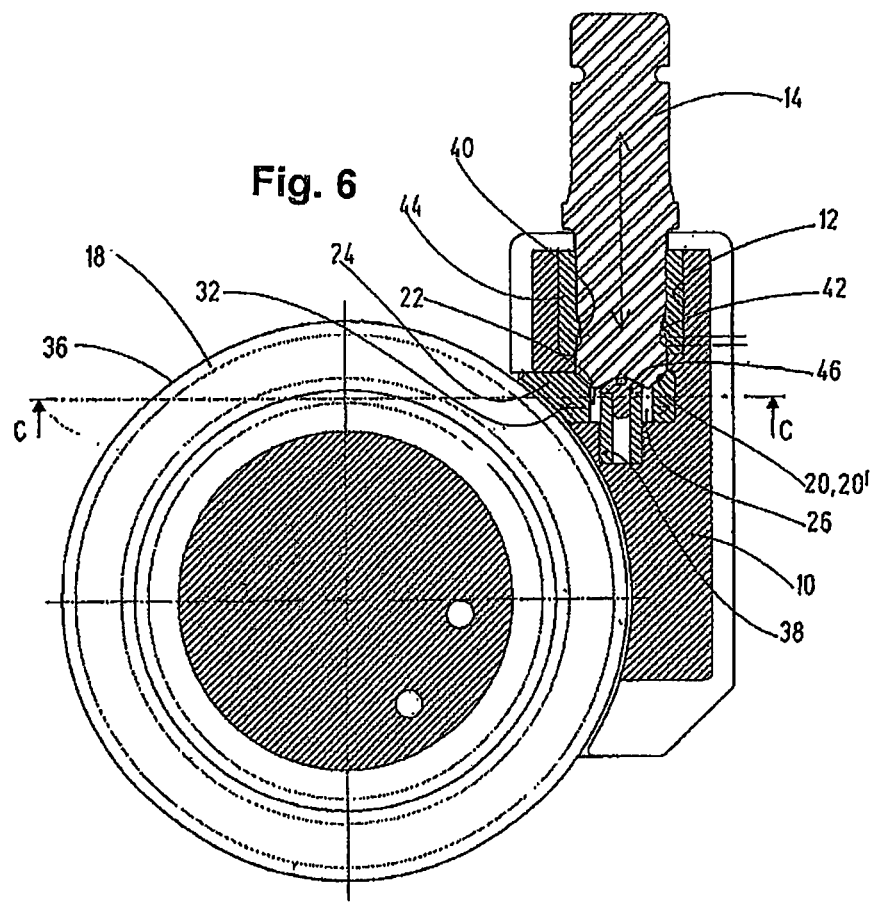

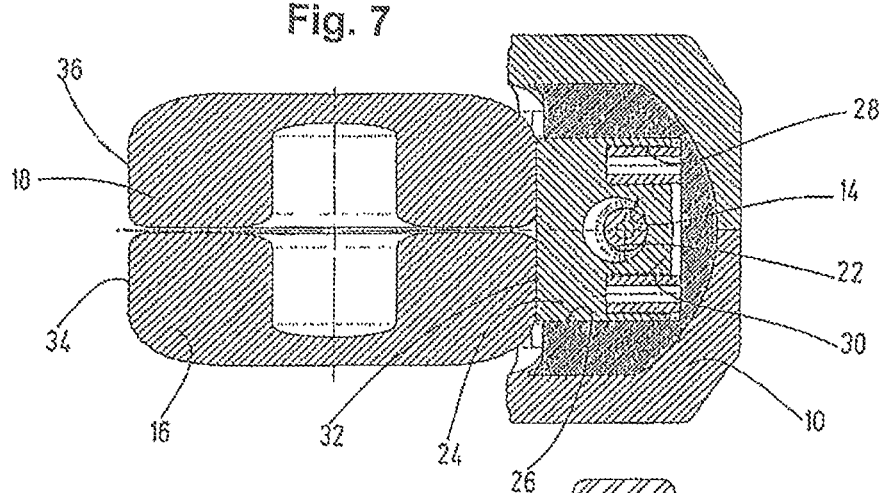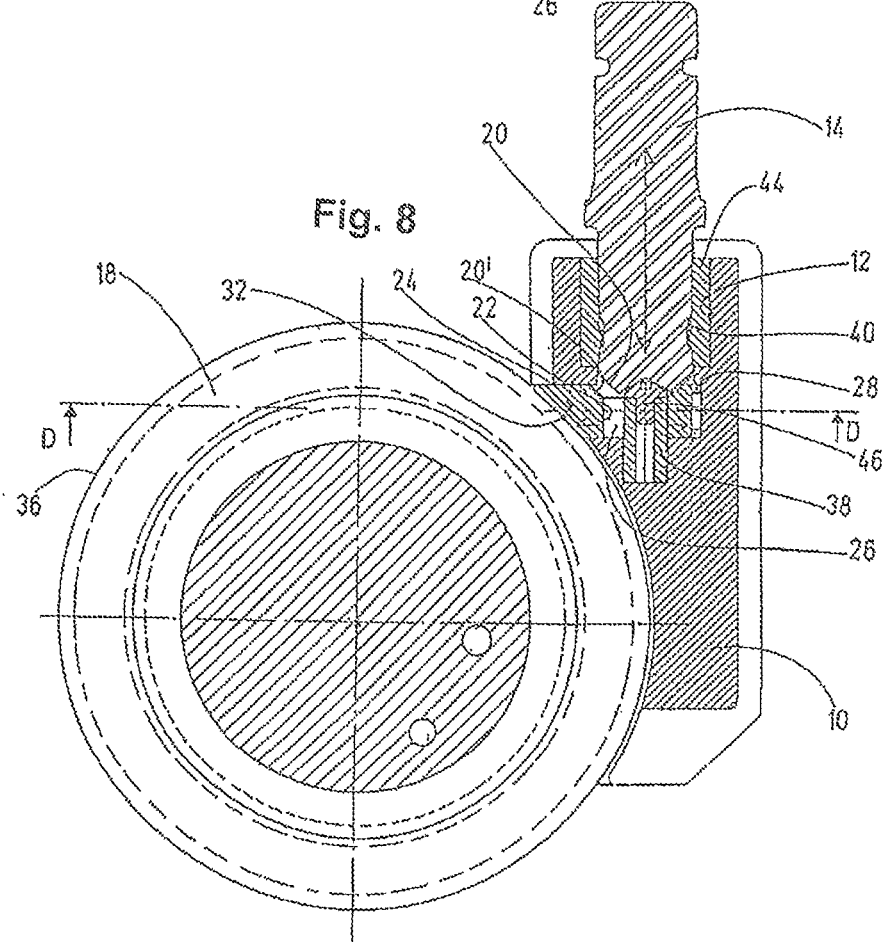

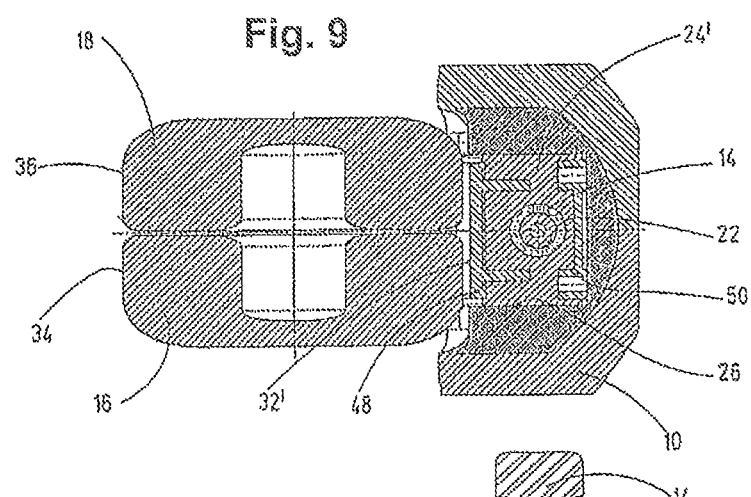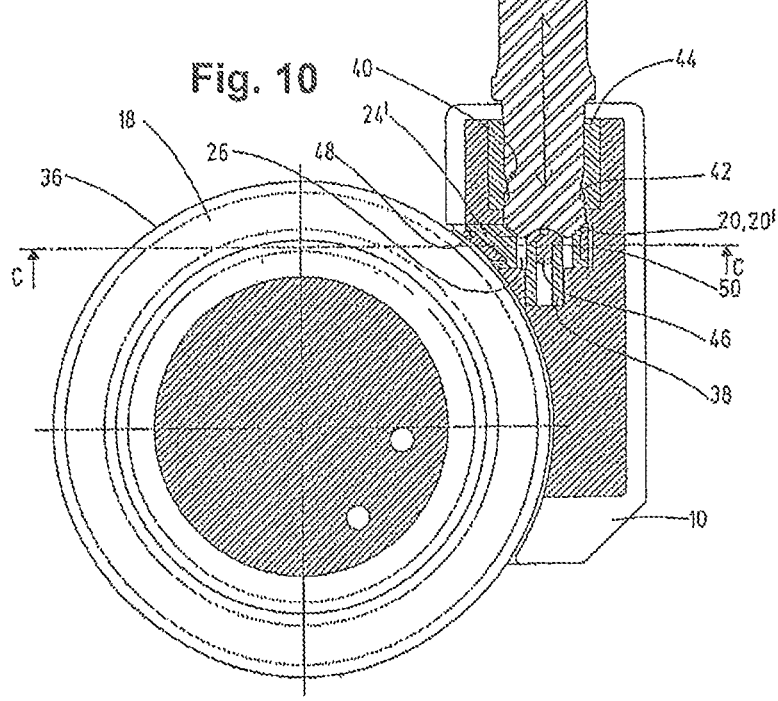

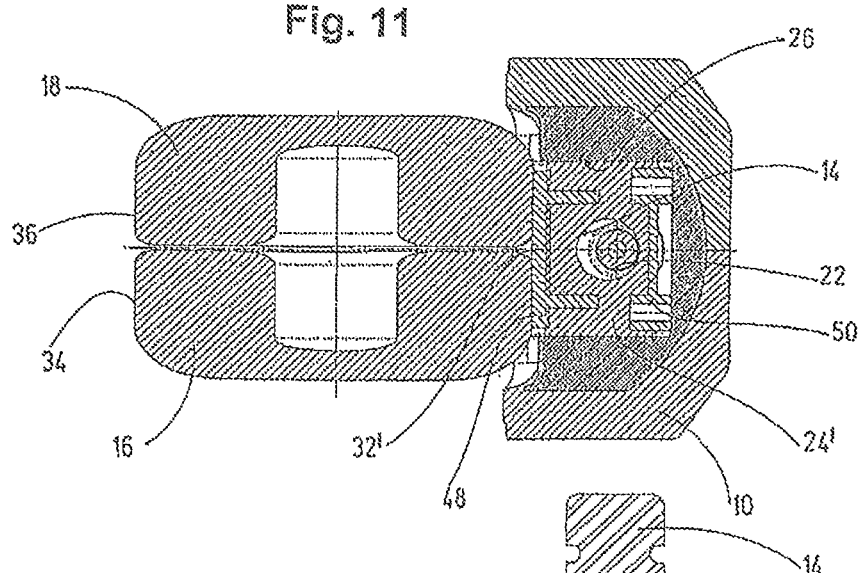
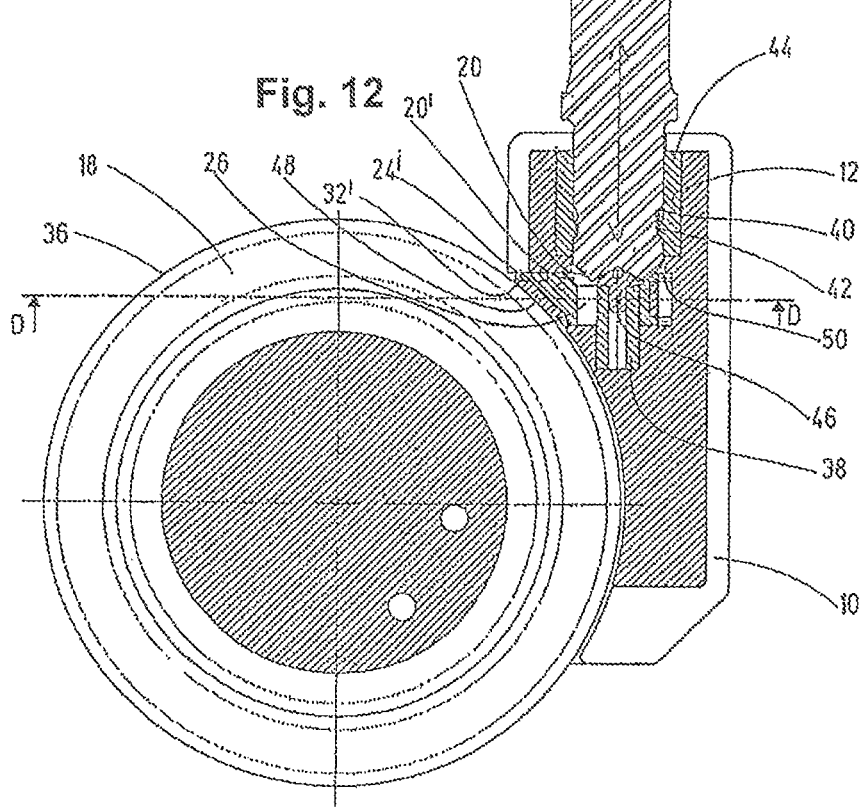

CASTOR WITH PIN-ACTIVATED BRAKE

FIELD OF THE INVENTION

The invention relates to a castor with at least one wheel, a housing carrying the at least one wheel, and a runner pin which is arranged so as to be movable to a limited extent in a substantially vertically oriented housing opening and which serves to connect the castor to an object, wherein the housing accommodates a brake device which frees the at least one wheel in a state in which the castor is loaded by a weight via the runner pin and which acts with a braking effect on the at least one wheel in a state when not loaded by a weight.

A castor of this kind can, for example, have a housing with a fork portion which receives the at least one wheel of the castor. The problem is to provide an efficient, load-dependent brake device that is arranged in a concealed manner. The load-dependent braking action is needed in office chairs, for example, which are intended to permit free rolling when a person is sitting on the chair and which are intended to brake the castors when the chair is not occupied, so as to prevent accidents by ensuring that the chair cannot roll away inadvertently. For design reasons, and in order to protect the brake device from dirt or damage, said brake device is intended to be arranged in a concealed manner. Integrating the brake device in the housing entails only a small installation space, and therefore the brake device has to be made compact. However, for a safe braking action, a minimum braking force is needed, and therefore the brake device has to be powerful while at the same time having compact dimensions.

OBJECT OF THE INVENTION

Proceeding from this, it is the object of the present invention to make available a castor which is of the type mentioned at the outset and which has an efficient, load-dependent and concealed brake device.

To achieve this object, the combination of features set forth below is proposed. Advantageous embodiments and refinements of the invention are also set forth below.

SUMMARY OF THE INVENTION

According to the invention, provision is made that a recess for a brake body is provided in the housing, that the brake body is arranged movably in the recess, that the brake body has a brake surface facing towards the at least one wheel, that the brake body, on its side facing away from the at least one wheel, is supported on the housing via at least one resiliently elastic element, wherein the at least one resiliently elastic element urges the brake body against the at least one wheel when the castor is not loaded by a weight, and that the brake body has a control surface or guide surface which interacts with a complementary control surface or guide surface of the runner pin in such a way that a stroke movement of the runner pin in the direction of the brake body moves the latter in a direction deviating from the lifting direction of the runner pin and lifts the brake surface of the brake body from the at least one wheel. The brake device is arranged entirely in the castor housing so that it is not visible from the outside. The actuation of the brake device is effected via the runner pin, which is connected to an object, typically an office chair. In a swivel castor, however, the runner pin cannot act directly on the at least one wheel, and therefore a separate brake body is necessary.

The underlying concept of the invention is to convert the vertical movement of the runner pin into a movement of the brake body away from the at least one wheel when the castor is loaded, wherein this direction deviates from the vertical for geometric reasons. In the invention, this is achieved by the interacting control surfaces or guide surfaces on the runner pin and on the brake body. When the castor is not loaded, the brake body is released and, by the action of the spring element, is pressed against the at least one wheel, as a result of which the latter is braked.

In a preferred embodiment of the invention, the brake body has a through-opening, through which there at least partially extends a spring element arranged on the bottom of the vertical housing opening designed as a blind hole for the runner pin, wherein the runner pin bears on the spring directly or by way of an interposed friction-reducing element. The runner pin is pressed upwards by the spring in the unloaded state of the castor and the brake body is released. The control surface or guide surface of the brake body is preferably formed by an edge area of the brake body that delimits the through-opening and that faces towards the underside of the runner pin. Moreover, the control surface or guide surface of the brake body is advantageously formed by a 30° to 60° chamfer, preferably a 45° chamfer, of the upper edge of the through-opening, and, accordingly, the control surface or guide surface of the runner pin is formed by a 30° to 60° chamfer, preferably a 45° chamfer, of the lower end of the latter. The lower, chamfered end of the runner pin thus occupies a cone seat on or in the opening of the brake body when the castor is loaded. Of course, the respective control surfaces or guide surfaces are circular, such that the interaction is ensured in every position of rotation of the castor in relation to the object.

In a further embodiment of the invention, the castor can have two wheels of the same diameter that are rotatable independently of each other. This facilitates a rotation of the castor about the runner pin axis, since the two individual wheels can then rotate in opposite directions, as is known for example from tracked vehicles, which are thus able to turn within a very small area.

According to a preferred embodiment of the invention, the at least one resiliently elastic element for supporting the brake body in the housing is formed by two helical springs arranged at a distance from each other. The braking force can be varied by the springs having different dimensions, and the use of two springs arranged at a distance from each other prevents jamming of the brake body in the housing. Alternatively, the at least one resiliently elastic element for supporting the brake body in the housing can be formed, for example, by one or more elastomer bodies.

The brake surface of the brake body can be formed integrally therewith and of the same material or can be formed by a brake lining made of a different material. In this way, the brake can be adapted to different running surface materials of the at least one wheel, for example to hard or soft castors for use on carpeted floors or on hard floors.

The housing can be made substantially of die-cast zinc or of a plastic, and the runner pin can be arranged in a cylindrical guide sleeve, which is fitted into the vertical housing opening and which is preferably made of a plastic. When die-cast zinc is used as a housing material, a plastic sleeve allows the runner pin to be pressed in. The guide sleeve expediently has an annular holding rib on its inside which engages in an indentation on the outer circumference of the runner pin and limits the vertical displacement path of the latter according to the axial extent of the indentation. A suitable displacement path in practice measures approximately 1 mm. The holding rib prevents the runner pin from being pressed out of the housing opening by pretensioned springs at the bottom of said housing opening.

If, in a further embodiment of the invention, the width of the brake surface corresponds at least to the width of a running surface of the at least one wheel, i.e. if the entire width of the running surface is therefore contacted by the brake surface of the brake body during braking, a certain cleaning effect of the running surface takes place over a fairly long period of use of the castor.

BRIEF DESCRIPTION OF THE DRAWINGS

The invention is explained in more detail below on the basis of an illustrative embodiment shown schematically in the drawing, in which:

FIG. 5 is a longitudinal section view of a two-wheel castor according to a first embodiment of the present invention in the loaded state;

FIG. 6 is a transverse section view of a two-wheel castor according to a first embodiment of the present invention in the loaded state;

FIG. 7 is a longitudinal section view of the two-wheel castor of FIG. 5 in the unloaded state;

FIG. 8 is a transverse section view of the two-wheel castor of FIG. 6 in the unloaded state;

FIG. 9 is a longitudinal section view of a two-wheel castor according to a second embodiment of the present invention in the loaded state;

FIG. 10 is a transverse section view of a two-wheel castor according to a second embodiment of the present invention in the loaded state.

FIG. 11 is a longitudinal section view of the two-wheel castor of FIG. 9 in the unloaded state; and FIG. 12 is a transverse section view of the two-wheel castor of FIG. 10 in the unloaded state.

DETAILED DESCRIPTION OF THE INVENTION

Figure 1:
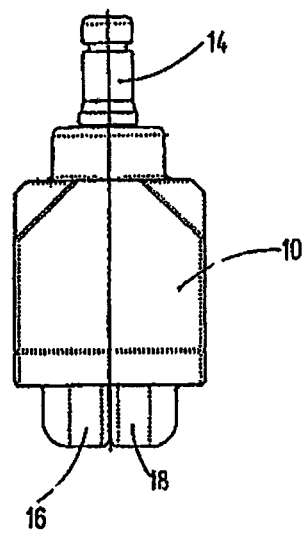
FIG. 1 is a front view of a two-wheel castor according to a first embodiment of the present invention.
Figure 2:
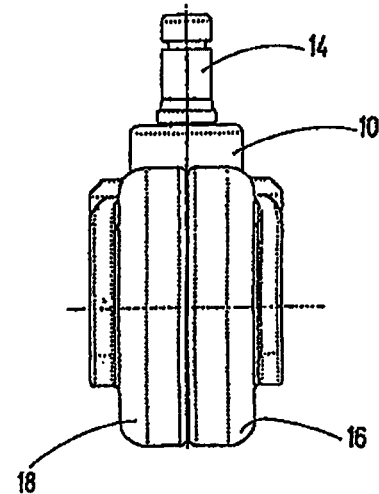
FIG. 2 is a rear view of a two-wheel castor according to a first embodiment of the present invention.
Figure 3:
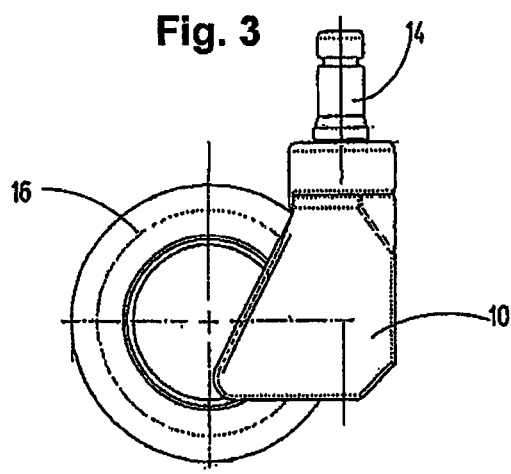
FIG. 3 is a side view of a two-wheel castor according to a first embodiment of the present invention.
Figure 4:
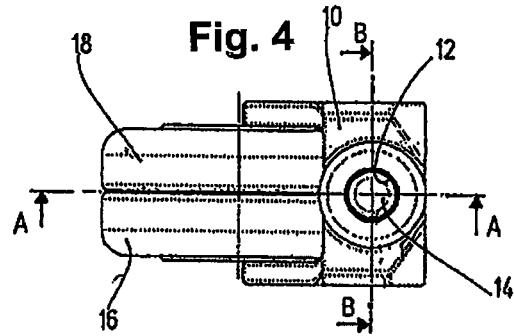
FIG. 4 is a plan view of a two-wheel castor according to a first embodiment of the present invention.

The castor illustrated in the drawing is composed principally of a housing 10 with a vertically oriented housing opening 12 (FIGS. 5 to 12) for receiving a runner pin 14 and two wheels 16, 18 arranged coaxially and directly adjacent to each other. Although the visual impression of the castor is intended to correspond to that of a single-wheel castor, the use of two wheels 16, 18 in the depicted configuration greatly improves the turning or swivelling of the castor in a confined space, since the two wheels are able to rotate in opposite directions.

FIGS. 5 and 6 show a first embodiment of the castor in the loaded state, in which the runner pin 14 is pressed downwards and, with its chamfered lower end 20, occupies a cone seat on a correspondingly chamfered (20') through-opening 22 in a brake body 24, which is designed as a substantially cuboid slide and which is arranged in a recess 26 of the housing 10. In this position, the through-opening 22 in the brake body 24 is concentric with respect to the housing opening 12 for receiving the runner pin 14. Two springs 28, 30 arranged at a distance from each other in blind holes in the brake body 24 are located in a pretensioned state. A brake surface 32 is lifted from running surfaces 34, 36 of the wheels 16, 18.

If the castor is unloaded as shown in FIGS. 7 and 8, the runner pin 14 is urged upwards by the force of a spring 38 arranged at the bottom of the housing opening 12 and is lifted at least partially from the cone seat. The stroke of the runner pin 14 is limited to approximately 1 mm by a holding rib 42 which engages in an indentation 40 in the jacket surface of the runner pin 14 and which forms part of a guide sleeve 44 fitted into the housing opening 12. Through the 45° chamfer of the control surfaces 20, 20', this is converted 1:1 into a stroke of the brake body which, by the force of the springs 28, 30, is pressed with its brake surface 32 against the running surfaces 34, 36 of the wheels 16, 18 and thus brakes or blocks the latter. A spring stop 46 made of plastic, inserted into the spring 38, sinks into a recess in the lower end face of the runner pin 14 and, during pivoting of the castor, prevents noise development and wear on the runner pin 14. For reasons of tribology, the guide sleeve 44 is likewise expediently made of a plastic and above all allows the runner pin 14 to be pressed in.

The illustrative embodiment of the castor shown in FIGS. 9 to 12 corresponds substantially to the embodiment in FIGS. 5 to 8 but has a modified brake body 24'. Otherwise, corresponding parts are provided with the same reference signs. The brake body 24' is provided, on the wheel side, with a brake lining 48, which has a brake surface 32' and which is made of a material different than that of the brake body. For example, the brake lining 48 can be made of a soft plastic such as rubber or the like and can interact with a hard running surface of the wheels 16, 18. Furthermore, no springs are inserted into the brake body 24' in order to generate the contact pressure against the wheels 16, 18, and instead an elastomer body 50 is inserted.

In the illustrative embodiments shown, the stroke of the runner pin 14 is converted into a stroke of the brake body 24, 24' at right angles through a 45° chamfer of the corresponding control surfaces or guide surfaces 20, 20' at a ratio of 1:1. If need be, however, it is also possible to choose other chamfer angles than 45° and to move the brake body 24, at an angle deviating from 90°, in relation to the runner pin 14. It is likewise possible to arrange the brake body not linearly movably but instead pivotably in the housing 10 and to design the control surfaces or guide surfaces 20, 20' on the brake body with a corresponding curvature.

In summary, the invention relates to a castor with at least one wheel 16, 18, a housing 10 carrying the at least one wheel 16, 18, and a runner pin 14 which is arranged so as to be movable to a limited extent in a substantially vertically oriented housing opening 12 and which serves to connect the castor to an object, wherein the housing accommodates a brake device which frees the at least one wheel 16, 18 in a state in which the castor is loaded by a weight via the runner pin 14 and which acts with a braking effect on the at least one wheel 16, 18 in a state when not loaded by a weight. In order to provide a concealed, compact and yet efficient brake device, it is proposed according to the invention that a recess 26 for a brake body 24, 24' is provided in the housing 10, that the brake body 24, 24' is arranged movably in the recess 26, that the brake body 24, 24' has a brake surface 32, 32' facing towards the at least one wheel 16, 18, that the brake body 24, 24', on its side facing away from the at least one wheel 16, 18, is supported on the housing 10 via at least one resiliently elastic element 28, 30; 50, wherein the at least one resiliently elastic element 28, 30; 50 urges the brake body 24, 24' against the at least one wheel 16, 18 when the castor is not loaded by a weight, and that the brake body 24, 24' has a control surface or guide surface 20' which interacts with a complementary control surface or guide surface 20 of the runner pin 14 in such a way that a stroke movement of the runner pin 14 in the direction of the brake body 24, 24' moves the latter in a direction deviating from the stroke direction of the runner pin 14 and lifts the brake surface 32, 32' of the brake body 24, 24' from the at least one wheel 16, 18.

The invention claimed is:

1. A castor with a braking device, comprising:
    at least one wheel, a housing carrying the at least one wheel, the housing having a vertically oriented housing opening, and a runner pin movably inserted in the housing opening, the braking device being capable of engaging the at least one wheel,
    wherein
        a recess for the braking device is provided in the housing,
        the braking device comprising a brake body arranged movably in the recess,
        the brake body has a brake surface facing towards the at least one wheel,
        the brake body, on its side facing away from the at least one wheel, is supported against an opposing wall of the recess via at least one resiliently elastic element which engages the brake body on a surface opposite the brake surface, the at least one resiliently elastic element urging the brake body against the at least one wheel, and
        the brake body has a control surface which interacts with a complementary control surface of the runner pin in such a way that a vertical movement of the runner pin in the direction of the brake body moves the brake body in a direction at an angle to the vertical movement direction of the runner pin and removes the brake surface of the brake body from contact with the at least one wheel, the brake body having a through-opening, through which there at least partially extends a spring element arranged on the bottom of the vertical housing opening designed as a blind hole for the runner pin, the runner pin bearing on the spring element directly or by way of an interposed friction-reducing element.

2. The castor according to claim 1, wherein the control surface of the brake body is formed by an edge area of the brake body that delimits the through-opening and that faces towards the underside of the runner pin.

3. The castor according to claim 1, wherein the control surface of the brake body is formed by a 30° to 60° chamfer of the upper edge of the through-opening.

4. The castor according to claim 3, wherein the control surface of the runner pin is formed by a 30° to 60° chamfer of the lower end of the runner pin.

5. The castor according to claim 1, wherein the castor has two wheels of the same diameter that are rotatable independently of each other.

6. The castor according to claim 1, wherein the housing has a portion in which the at least one wheel is arranged.

7. The castor according to claim 1, wherein the at least one resiliently elastic element for supporting the brake body in the housing is formed by two helical springs arranged at a distance from each other.

8. The castor according to claim 1, wherein the at least one resiliently elastic element for supporting the brake body in the housing is formed by one or more elastomer bodies.

9. The castor according to claim 1, wherein the brake surface of the brake body is formed integrally therewith and of the same material or is formed by a brake lining made of a different material.

10. The castor according to claim 1, wherein the housing is made substantially of die-cast zinc or a plastic, and in that the runner pin is arranged in a cylindrical guide sleeve, which is fitted into the vertical housing opening and which is preferably made of a plastic.

11. The castor according to claim 10, wherein the guide sleeve has an annular holding rib on its inside, which holding rib engages in an indentation on an outer circumference of the runner pin and limits the vertical displacement path of the runner pin according to an axial extent of the indentation.

12. The castor according to claim 1, characterized in that the width of the brake surface corresponds at least to the width of a running surface of the at least one wheel.

* * * * *